United States Patent [19]
Pena

[11] Patent Number: 5,641,147
[45] Date of Patent: Jun. 24, 1997

[54] MONOPOD MOUNT

[76] Inventor: Louis Thomas Pena, 15523 Barbarossa Dr., Houston, Tex. 77083

[21] Appl. No.: 345,677

[22] Filed: Nov. 28, 1994

[51] Int. Cl.[6] .................................................. A47G 29/00
[52] U.S. Cl. ............................................................. 248/688
[58] Field of Search ................................. 248/688, 171.1, 248/178.1, 185.1, 183.2; 42/94; 135/909, 139, 140, 141, 142, 25.1, 28

[56] References Cited

U.S. PATENT DOCUMENTS

| | | | |
|---|---|---|---|
| D. 327,525 | 6/1992 | Pena | D22/108 |
| 2,481,717 | 9/1949 | Blair | 248/183.2 |
| 5,083,883 | 1/1992 | Ueda et al. | 403/328 |
| 5,154,382 | 10/1992 | Hoshino | 248/185.1 |
| 5,226,622 | 7/1993 | LeAnna | 248/183.2 |
| 5,281,975 | 1/1994 | Hugo | 248/183.2 |
| 5,335,142 | 8/1994 | Anderson | 248/183.2 |

Primary Examiner—Leslie A. Braun
Assistant Examiner—Willie Berry, Jr.
Attorney, Agent, or Firm—Chamberlain, Hrdlicka, White, Williams & Martin; John R. Casperson

[57] ABSTRACT

A support head for a monopod mount is disclosed which is especially useful for attachment to outdoor sporting goods such as firearms, spotting scopes, binoculars, bows and cameras. The head is formed from a base portion which attaches to the sporting good and a support leg mounting portion which pivotally attaches to the base portion. Preferably, the support leg mounting portion is provided with a quick release for the support leg and is mounted to the base portion so that it can be frictionally affixed in the desired orientation.

3 Claims, 1 Drawing Sheet

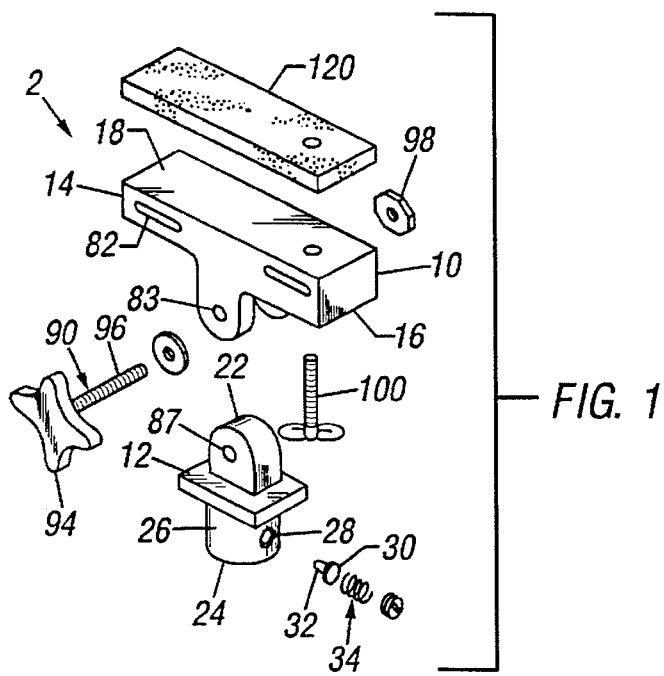
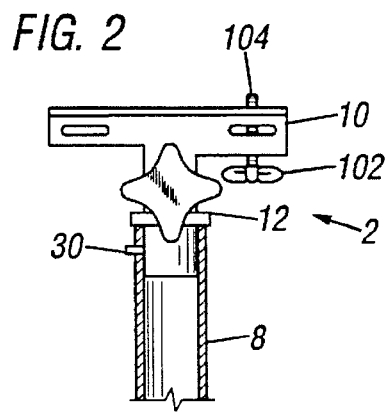
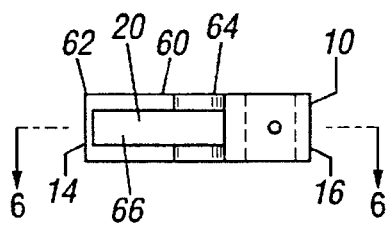
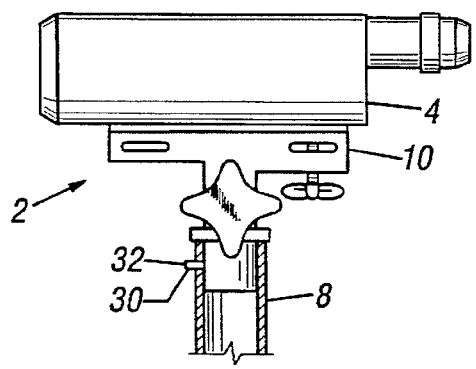
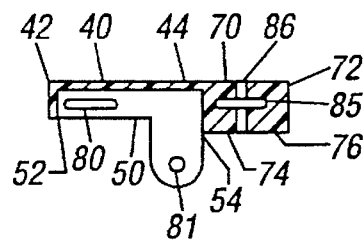

MONOPOD MOUNT

BACKGROUND OF THE INVENTION

This invention relates to a mounting device especially useful for firearms, spotting scopes, cameras, bows and the like.

In my U.S. Design Pat. No. 327,525, issued Jun. 30, 1992, I claimed the ornamental design for a firearm support. I have now made certain improvements to that design, as described and claimed herein.

It is difficult for a shooter to hold a firearm steady enough from the offhand position to ensure adequate accuracy for long range shots. Also, it is difficult for shooters such as bow hunters or turkey hunters, to hold their weapons steadily on target even at short range for extended periods of time. A device to assist the shooter for such shots would be very desirable.

The users of high magnification optical devices, such as cameras, spotting scopes, or high power binoculars, have a similar problem. After a few seconds of hold, the user's steadiness generally decreases to the point where adequate definition of the object being studied is lost. An attachment to assist the users of these devices in achieving adequate steadiness would be very desirable.

Another problem facing those going afield after wild game is that the animals of interest usually only present themselves for just a few seconds. In fact, big game animals are typically visible to a hunter for only about 3 or 4 seconds. A steadying device which can be placed into operable configuration within a second or two would be very desirable.

Another problem facing those going afield is the weight and bulk of their gear. Multipurpose equipment and equipment having interchangeable parts is very desirable for this reason. A multipurpose steadying device with interchangeable parts would be very desirable.

OBJECTS OF THE INVENTION

It is an object of this invention to, provide a steadying device for hand-held outdoor equipment.

It is a further object of this invention to provide a steadying device for hand-held outdoor equipment which can be quickly put into an operable configuration.

It is another object of this invention to provide a steadying device for hand-held outdoor equipment which can be easily stored for portability.

It is another object of this invention to provide a steadying device for hand-held outdoor equipment which has interchangeable parts to minimize the items which must be transported.

It is another object of this invention to provide a steadying device for hand-held outdoor equipment which is multiuse and multipurpose.

These and other objects of the invention will become more apparent from the following drawings, the detailed description and the claims.

SUMMARY OF THE INVENTION

In accordance with one embodiment of the invention, there is provided a mounting head to connect a piece of hand held outdoor equipment to a monopod support leg to steady the piece of hand held outdoor equipment. The mounting head comprises a base member and a support leg mounting member. The base member has a first end, a second end, a longitudinal axis extending between the first end and the second end, an upper surface, and an oppositely facing lower surface. The support leg mounting member is pivotally mounted to the base member so as to pivot normally to the lower surface of the base member in a plane extending generally radially from the longitudinal axis of the base member. The support leg mounting member has an upper end positioned adjacent to the base member and a lower end and a longitudinal axis extending between the upper end and the lower end. A generally cylindrical support leg positioning surface extends along the longitudinal axis of the support leg mounting member from the lower end. The support leg mounting member has a generally transverse borehole extending at least partially therethrough which is generally radially oriented with respect to the longitudinal axis of the support leg mounting member and opens onto the support leg positioning surface. A locking pin is mounted in the borehole. An end of the locking pin protrudes from the borehole. A means is mounted in the borehole to bias the locking pin radially outwardly from the longitudinal axis of the support leg mounting member.

A plurality of support heads can be mounted to various pieces of hand held outdoor equipment, one head per piece, and taken afield. When a monopod support is needed, a support leg having a hole to receive the locking pin can be rapidly attached to the support leg mounting member. If support is needed for another piece, the support leg can be rapidly detached and reattached to the different piece by depressing the pin and removing the support leg. In this manner, only a single support leg need be carried. When attached to a firearm, the support leg can be pivoted against the stock for ease of carry. When the support leg mounting member is attached to the base member with a tightenable screw and a lightweight support leg is employed, the support leg can be reliably positioned against the stock with no additional fasteners.

BRIEF DESCRIPTION OF THE DRAWINGS

FIG. 1 is an exploded view of a mount embodying certain features of the present invention.

FIG. 2 is a side view of the mount or FIG. 1 in the assembled state and showing a portion of an affixed monopod leg in cross section.

FIG. 3 is a bottom view of a portion of the device as shown in FIG. 1.

FIG. 4 is a pictorial view of the device as shown in FIG. 2 as it could be deployed attached to a spotting scope.

FIG. 5 is a pictorial view of the device as shown in FIG. 3 as it could be deployed attached to a firearm.

FIG. 6 is cross sectional view of a portion of the device shown in FIG. 1.

DETAILED DESCRIPTION OF THE PREFERRED EMBODIMENTS

In accordance with one embodiment of the invention, there is provided a mounting head 2 to connect a piece of hand held outdoor equipment such as it spotting scope 4 or a firearm 6 to a monopod support leg 8 to steady the piece of hand held outdoor equipment.

The mounting head 2 comprises a base member 10 and a support leg mounting member 12. The base member 10 has a first end 14, a second end 16, an imaginary longitudinal axis extending between the first end and the second end, an upper surface 18, and an oppositely facing lower surface 20. The support leg mounting member 12 is pivotally mounted to the base member 10 so as to pivot normally to the lower surface of the base member in a plane extending generally radially from the longitudinal axis of the base member.

The support leg mounting member 12 has an upper end 22 positioned adjacent to the base member, a lower end 24 and an imaginary longitudinal axis extending between 10 the upper end and the lower end. A generally cylindrical support leg positioning surface 26 extends coaxially along the longitudinal axis of the support leg mounting member from the second end. The support leg mounting member 12 has a generally transverse borehole 28 extending at least partially therethrough which is generally radially oriented with respect to longitudinal axis of the support leg mounting member 12 and opens onto the support leg positioning surface 26. A locking pin 30 is mounted in the borehole. An end 32 of the locking pin 30 protrudes from the borehole. A means 34 is mounted in the borehole to bias the locking pin 30 radially outwardly from the longitudinal axis of the support leg mounting member 12. In the illustrated embodiment, the means 34 combines a coil spring and a set screw. The locking pin has a nose which forms the end 32 connected to the pin body by an annular shoulder which seats against a corresponding annular shoulder in the borehole 28. The borehole 28 is partially threaded to receive the set screw.

In a preferred embodiment of the invention, the base member 10 comprises an upper plate portion 40, a first sidewall 50, a second sidewall 60, and a block portion 70. The upper plate portion 40 has a first end 42 and a second end 44. The plate portion 40 extends from the first end 14 of the base member toward the second end 16 of the base member. The upper plate portion 40 has an upper surface which forms a first portion of the upper surface 18 of the base member 10.

The first sidewall 50 has a first grid 52 and a second end 54. The first sidewall extends alongside the upper plate portion 40 and depends generally normally away from the upper surface of the upper plate portion from a first lateral edge of the upper plate portion.

The second sidewall 60 has a first end 62 and a second end 64. The second sidewall extends alongside the upper plate portion 40 and depends generally normally away from the upper surface of the upper plate portion from a second lateral edge of the upper plate portion. The second sidewall is positioned alongside the first sidewall in a plane which is generally parallel to the first sidewall. A first slot 66 is defined between the first sidewall and the second sidewall.

Most preferably, the first sidewall 50 further defines a first longitudinally elongated transverse slot 80 and a first transverse borehole 81 positioned between the slot 80 and the second end 54 of the first sidewall 50. The second sidewall 60 defines a second longitudinally elongated transverse slot 82 which is aligned with the first longitudinally elongated transverse slot 80 and a second transverse borehole 83 which is aligned with the first transverse borehole 81 and is positioned between the second slot 82 and the second, and 64 of the second sidewall 60. The transverse boreholes preferably are defined by tabs which extend from the lower edge of the sidewalls.

The block portion 70 has a first end 72 and a second end 74. The block portion extends from the second end 16 of the base member 10 toward the first end 14 of the base member 10. The second end 74 of the block portion is connected to the second end 44 of the upper portion 40, the second end 54 of the first sidewall, and the second end 64 of the second sidewall. The block portion 70 has an upper surface which forms a second portion of the upper surface 18 of the base member. The block portion 70 has a lower surface 76 which is generally parallel to the upper surface 18. The block portion 70 further defines a third longitudinally elongated transverse slot 85 which is oriented generally parallel to the upper surface 18 and generally normal to the longitudinal axis of the base member and a transverse borehole 86 extending from the upper surface of the block to the lower surface of the block generally normal to the longitudinal axis of the base member.

Preferably, the support leg mounting member defines a generally transversely extending third borehole 87 near the upper end. A shaft means 90 extends through the first borehole 81, the second borehole 83 and the third borehole 87 to pivotally connect the support leg mounting member 12 to the base member 10.

More preferably, the shaft means 90 comprises a screw having a head end 94 and a generally cylindrical end 96. A nut 98 is mounted on the generally cylindrical end 96 of the screw. The head end 94 of the screw is positioned on a first side of the base member and the nut is positioned on a second side of the base member.

Preferably, the upper end of the support leg mounting member is closely received by the first sidewall and the second sidewall so that tightening the nut on the screw will move the first sidewall and the second sidewall into frictional engagement with the upper end of the support leg mounting member and retain the support leg mounting member in a desired orientation. Maintaining the desired orientation is facilitated by using a lightweight support leg 8. For example, a lightweight, telescoping support leg formed from aluminum provides good results. The base member and the support leg mounting member of the mounting head can be formed from plastic. FIG. 5 illustrates how this feature of the invention can be used with good results with a firearm so that it can be conveniently carried and quickly deployed.

For multiple uses, the mounting head can be provided with a screw 100 having a head end 102 and a generally cylindrical end 104 positioned in the borehole 86 which extends through the block portion from the upper surface to the lower surface. The head of the screw is positioned adjacent to the lower surface of the block portion. The screw 100 should be sized to fit standard threaded bore on cameras, spotting scopes and the like. FIG. 4 illustrates this feature of the invention being used to mount a spotting scope to the mounting head. Most preferably, a first strap 110 extends through the first transverse slot 80 and the second transverse slot 82. A second strap 112 extends through the third transverse slot 85. The straps preferably are formed from fabric and have Velcro fastening devices on their ends to provide a means for quickly affixing the mounting head to a wide variety of sporting goods not having a threaded screw hole. FIG. 5 shows this feature of the invention being used to affix the mounting head to a firearm.

For reliable positioning of the mounting head, an elastomeric pad 120 can be affixed to the upper surface 18 of the base member 10. This permits the fastening devices to be more tightly secured and provides a higher coefficient of friction between the mounting head and the device to which it is attached, making movement less likely.

The mounting head can be used in combination with the support leg 8. Preferably, the support leg is generally tubular and is defined by a sidewall 130 and having a first end 132 and a second end 134. The tubular support leg has a generally cylindrical inner surface adjacent to the first end 132 closely receiving a generally cylindrical outer surface of the support leg mounting member, as best shown in FIGS. 2 and 4. The sidewall of the generally tubular support leg defines a borehole adjacent to the first end 132 of the generally tubular support leg. The support leg 8 is positioned so that the pin 30 protruding from the support leg mounting member 12 passes through the borehole to releaseably position the support leg on the support leg mounting member. Most preferably, the generally cylindrical support leg positioning surface is closely received by the generally cylindrical inner surface of the tubular support leg.

What is claimed is:

1. A mounting head to connect a hand held device to a monopod support leg to steady the hand held device, said mounting head comprising a base member having first end, a second end, a longitudinal axis extending between the first end and the second end, an upper surface, and an oppositely facing lower surface;

a support leg mounting member pivotally mounted to the base member so as to pivot normally to the lower surface of the base member in a plane extending generally radially from the longitudinal axis of the base member, said support leg mounting member having an upper end positioned adjacent to the base member and a lower end and a longitudinal axis extending between the upper end and the lower end and a generally cylindrical support leg positioning surface extending along the longitudinal axis from the lower end of the support leg mounting member, said support leg mounting member having a generally transverse borehole extending partially therethrough, said borehole being generally radially oriented with respect to the longitudinal axis of the support leg mounting member and opening onto the support leg positioning surface;

a locking pin mounted in the generally radially oriented transverse borehole, said locking pin having an end portion which protrudes from the borehole; and a means mounted in the generally oriented transverse borehole to bias the locking pin radially outward from the longitudinal axis of the support leg mounting member;

wherein the base member comprises an upper plate portion extending from the first end of the base member toward the second end of the base member, said upper plate portion having a first end, a second end and an upper surface which forms a first portion of the upper surface of the base member;

a first sidewall having a first end and a second end, said first sidewall extending alongside the upper plate portion and depending generally normally away from the upper surface of the upper plate portion from a first lateral edge of the upper plate portion;

a second sidewall having a first end and a second end, said second sidewall extending alongside the upper plate portion and depending generally normally away from the upper surface of the upper plate portion from a second lateral edge of the upper plate portion, said second sidewall further being positioned alongside the first sidewall in a plane parallel to the first sidewall;

a first slot being defined between the first sidewall and the second sidewall;

wherein the first sidewall further defines a first longitudinally elongated transverse slot and a first transverse borehole positioned between the slot and the second end of the first sidewall;

wherein the second sidewall defines a second longitudinally elongated transverse slot which is aligned with the first longitudinally elongated transverse slot and a second transverse borehole which is aligned with the first transverse borehole positioned between the second slot and the second end of the second sidewall;

a block portion having a first end and a second end extending from the second end of the base member toward the first end of the base member, the second end of the block portion being connected to the second end of the upper plate portion, the second end of the first sidewall, and the second end of the second sidewall, said block portion having an upper surface which forms a second portion of the upper surface of the base member and a lower surface which is generally parallel to the upper surface;

wherein the block portion defines a third longitudinally elongated transverse slot which is oriented generally parallel to the upper surface and generally normal to the longitudinal axis of the base member and a transverse borehole extending from the upper surface of the block portion to the lower surface of the block portion generally normal to the longitudinal axis of the base member;

wherein the support leg mounting member defines a generally transversely extending third borehole near the upper end, said mounting head further comprising a shaft means extending through the first borehole, the second borehole and the third borehole to pivotally connect the support leg mounting member to the base member;

wherein the shaft means further comprises a screw having a head end and a generally cylindrical end; and a nut mounted on the generally cylindrical end of the screw;

wherein the head end of the screw is positioned on a first side of the base member and the nut is positioned on a second side of the base member;

wherein the upper end of the support leg mounting member is closely received by the first sidewall and the second sidewall so that tightening the nut on the screw will move the first sidewall and the second sidewall into frictional engagement with the upper end of the support leg mounting member and retain the support leg mounting member in a desired orientation;

wherein the mounting head further comprises an elastomeric pad affixed to the upper surface of the base member;

a first strap extending through the first transverse slot and the second transverse slot; and a second strap extending through the third transverse slot.

2. A mounting head as in claim 1, in combination with a generally tubular support leg defined by a sidewall and having a first end and a second end, said tubular support leg having a generally cylindrical inner surface adjacent to the first end closely receiving a generally cylindrical outer surface of the support leg mounting member, the sidewall of the generally tubular support leg further defining a borehole adjacent to the first end of the generally tubular support leg and positioned so the pin protruding from the support leg mounting member passes through the borehole to releaseably position the support leg on the support leg mounting member.

3. A combination as in claim 2 wherein the generally cylindrical support leg positioning surface is closely received by the generally cylindrical inner surface of the tubular support leg.

* * * * *